Jan. 17, 1939.    E. VOLLENWEIDER    2,144,211
SELECTIVE DRIVE FOR PROJECTOR REELS
Filed March 18, 1938
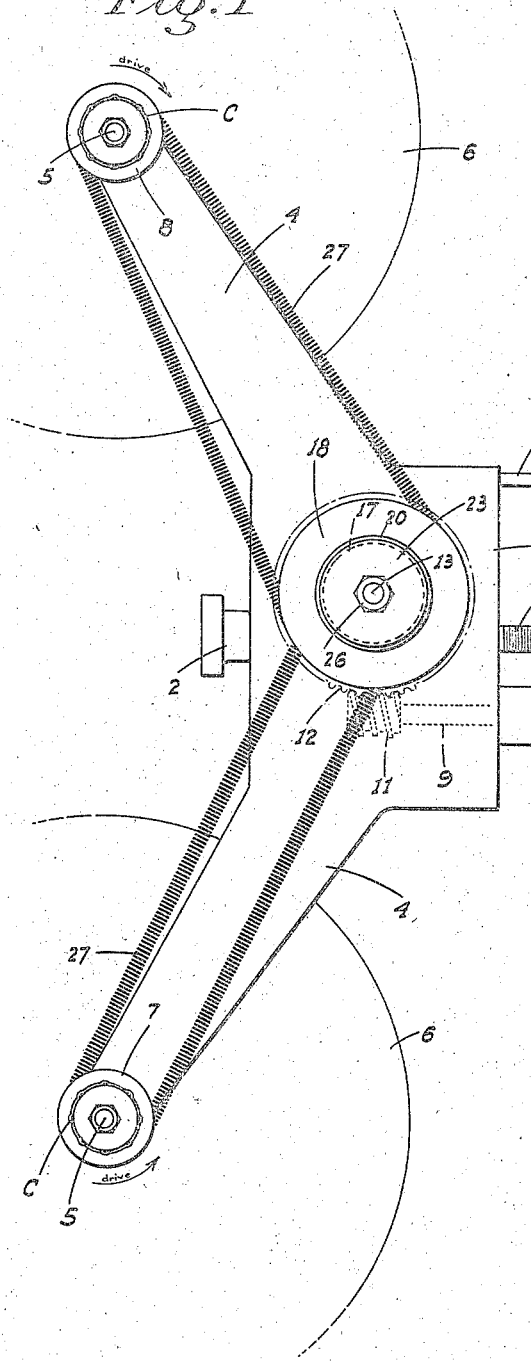
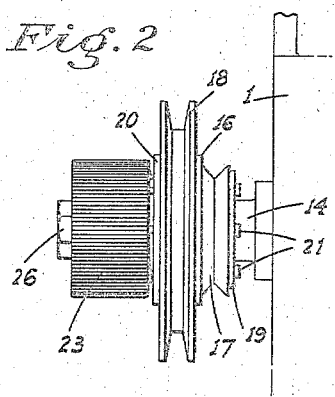
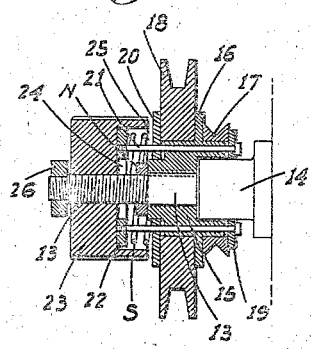
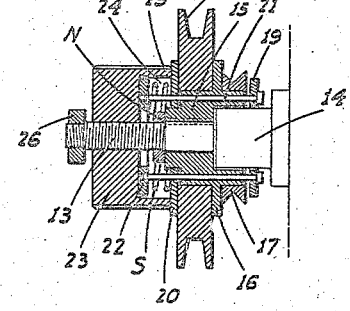
INVENTOR
Emil Vollenweider
BY 
ATTORNEY Patented Jan. 17, 1939

2,144,211

UNITED STATES PATENT OFFICE 2,144,211

SELECTIVE DRIVE FOR PROJECTOR REELS

Emil Vollenweider, Sacramento, Calif.

Application March 18, 1938, Serial No. 196,697

14 Claims. (Cl. 242—55)

This invention relates generally to improvements in the reel drive mechanism of motion picture projectors, and in particular the invention is directed to a selective drive mechanism for the reels of those portable motion picture projectors designed for home use and the like.

The principal object of this invention is to provide a selective drive mechanism for use on motion picture projectors which includes a reversible motor, and wherein one reel is adapted to be driven during film projection and the other reel adapted to be driven for reverse take-up of the film; the mechanism being arranged so that either film reel can be driven, selectively and without the necessity of manual adjustment, through the medium of a yieldable friction drive.

Another object of the invention is to provide a mechanism for the purpose described, so arranged that a simple manipulation of a control member, will selectively bring into operation the yieldable friction drives for the reels as above, or a high speed positive drive for one reel when rewinding the film.

A further object of the invention is to provide a selective drive mechanism for reels which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the reel arms of a projector and supporting housing; my improved drive mechanism being shown in end elevation and as mounted on said housing.

Figure 2 is a side elevation of the mechanism.

Figure 3 is a sectional elevation of the mechanism in yieldable frictional driving position.

Figure 4 is a sectional elevation of the mechanism in position to positively drive one reel for rewind, and to permit the other reel to freewheel.

Referring now more particularly to the characters of reference on the drawing, the numeral 1 indicates a housing adapted for removable connection with the body of a projector by means of a finger bolt 2 and locating pin 3. Diverging reel supporting arms 4 extend from the housing and at their outer ends carry spindles 5 on which the reels 6 are mounted in the usual manner. These spindles are also provided with pulleys, shown at 7 and 8 respectively; with an overrunning clutch C between each pulley and the corresponding spindle. These clutches are opposed so that said pulleys drive in opposite directions as shown by the arrows in Fig. 1 and as is common practice.

A drive shaft 9 is mounted within the housing 1 and its outer end includes coupling meeans 10 for engagement with the motor drive assembly on the body of the projector. The inner end of shaft 9 carries a worm 11 which drives a gear 12 fixed on the inner end of a spindle 13 which is journaled in a boss 14 on the housing. The spindle 13 extends some distance outward from the boss as shown.

The selective drive mechanism for the reels is mounted on such extended portion of the spindle and is constructed as follows:

A circular hub 15 is held in keyed relation on the spindle 13 by means of nut N threaded on the spindle; the hub being bored at one end to overlie a portion of boss 14. The peripheral face of the hub is separated substantially centrally of its width by an integral radial flange 16; a relatively small pulley 17 being rotatably mounted on the hub inwardly of flange 16, and a relatively large pulley 18 is rotatably mounted on the hub outwardly of the flange. Both pulleys 17 and 18 are of sufficient thickness so that one face extends a short distance beyond the corresponding end of the hub, as shown in Figs. 3 and 4, when the other face is in engagement with flange 16. A friction disc 19 surrounds boss 14 in sliding relation thereto for movement into and out of engagement with the adjacent face of pulley 17, while another similar disc 20 is slidably mounted on the outer end of the hub, which is reduced in diameter as shown, for yieldable frictional or positive driving engagement with the adjacent face of pulley 18, as will hereinafter appear.

A plurality of circumferentially spaced bolts 21 extend from the disc 19 through the hub 15 parallel to the axis thereof, through the disc 20 in slidable relation to a termination therebeyond in connection with a third disc 22 which surrounds spindle 13 in clearance relation. A compression spring S surrounds the spindle 13 between disc 20 and disc 22.

A relatively large control knob 23 is threaded on the spindle, the spindle being cut with left hand or reverse threads. This knob is formed with a bore 24 from its inner end and the projecting portion of bolts 21, the disc 22 and spring S are disposed in said bore. The bore 24 forms an annular flange 25 on the knob and such flange engages disc 20 as the knob moves inward with rotation thereof in the proper direction. The bore is of such depth that when flange 25 is clear of disc 20, disc 22 is in a position to place disc 19 in frictional engagement with the pulley 17.

The extreme outer end of the spindle is reduced in diameter, threaded, and provided with a retaining nut 26. Spring type endless belts 27 connect pulleys 17 and 18 in driving relation with pulleys 7 and 8 respectively.

*Operation*

In operation, my selective drive mechanism for the projector reels functions in the following manner:

The lower reel is the one that is driven during forward projection, and such drive is accomplished by means of belt 27 extending between pulley 17 and reel pulley 7. The drive mechanism in this case is as shown in Fig. 3. The control knob 23 is positioned on the spindle with annular flange 25 free of disc 20, allowing spring S to urge disc 22 outwardly, resulting in disc 19 frictionally engaging the adjacent face of pulley 17, and also shifting the pulley into yieldable frictional driving relation with the flange 16. Thus, when the projector spindle 13 is rotating in a direction to rotate the lower reel in the direction indicated, pulley 17 is disposed in frictional driving relation with hub 15. This is desirable for the reason that this pulley can compensate for any differential in speed between the speed of the reel and the speed at which the film is being fed through the projector film gate.

If it is desired to run the projector backwards, as is often done so that a certain portion of a film can be reprojected, the projector motor is merely reversed and no adjustment of the drive mechanism is required. The upper reel 6 then is driven by means of the belt connected reel pulley 8 and drive pulley 18 to effect the reverse take-up of the film as is requisite. This likewise is a yieldable friction drive as pulley 18, as shown in Fig. 3, is normally held in frictional driving relation with flange 16 by means of disc 20 and spring S.

For re-winding of the film, knob 23, is rotated anti-clockwise on threaded spindle 13, until annular flange 25 firmly engages disc 20 and positively clamps the same against pulley 18, and the latter against flange 16. When this occurs, disc 22 has been moved inward and, through the influence of bolts 21 disc 19 has been moved free of pulley 17, releasing the same. Thus, when the motor of the projector is reversed to rewind the film, reel pulley 8 is positively driven at a relatively high speed from pulley 18, and as pulley 17 then runs free or free-wheels on the hub, there is no tendency for any drag to occur on the film, and which would otherwise probably cause breaking of the film. Due to the high speed at which the film is rewound, it is requisite that pulley 18 be a positive drive from spindle 13, rather than a yieldable frictional drive.

As the control knob 23 is threaded on spindle 13 with reverse threads, it is possible for the operator to start the projector motor in one direction or the other and then by merely grasping knob 23, such knob will be moved to the proper position. For example, if the knob is positioned clear of disc 20, and the projector motor is started in a direction for film rewind, the knob 23, upon being grasped by the operator, immediately moves into engagement with disc 20, which is in turn positively clamped against pulley 18 assuring a positive drive connection of said pulley as above described.

The mechanism above described, while shown in the drawing as being associated with a belt drive, can be used successfully with either a gear or chain drive.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A selective drive mechanism for projector reels, said mechanism comprising a spindle adapted to be reversibly driven, a pair of reel drive pulleys, one for each reel, journaled on the spindle, and means to place both of said pulleys in yieldable frictional driving relation with the spindle or to place one pulley in positive driving relation with the spindle, selectively.

2. A device as in claim 1 in which the other pulley is released from driving relation with the spindle upon said one pulley being placed in such positive driving relation with the spindle.

3. A device as in claim 1 in which said one pulley is of relatively large diameter and is adapted to drive the film rewind reel.

4. A device as in claim 1 in which the other pulley is adapted to drive the film take-up reel during projection, and said one pulley is adapted to drive the film rewind reel.

5. A selective drive mechanism for projector reels, said mechanism comprising a spindle adapted to be reversibly driven, a hub secured on the spindle, an annular flange extending radially from the hub intermediate the ends thereof, a pair of reel pulleys, one for each reel, journaled on the hub and with the flange therebetween, and means to engage both pulleys with the flange in yieldable driving relation, or to engage one pulley with the flange in positive driving relation, selectively.

6. A selective drive mechanism for projector reels, said mechanism comprising a spindle adapted to be reversibly driven, a hub secured on the spindle, an annular flange extending radially from the hub intermediate the ends thereof, a pair of reel pulleys, one for each reel, journaled on the hub and with the flange therebetween, the pulleys each being of a thickness to extend beyond the adjacent end of the hub, a friction disc surrounding the spindle adjacent each pulley and disposed for engagement with the outer face thereof, and means to urge the discs toward said flange; said means being arranged so that both pulleys may be engaged with the flange in yieldable frictional driving relation, or one pulley engaged with the flange in positive driving relation, selectively.

7. A device as in claim 6 in which said means includes a control knob threaded on the spindle beyond the hub.

8. A selective drive mechanism for projector reels, said mechanism comprising a spindle adapted to be reversibly driven, a hub secured on the spindle, an annular flange extending radially from the hub intermediate the ends thereof, a pair of reel pulleys, one for each reel, journaled on the hub and with the flange therebetween, the pulleys each being of a thickness to extend beyond the adjacent end of the hub, a friction disc surrounding the spindle adjacent each pulley and disposed for engagement with the outer face thereof, a third disc surrounding the spindle outwardly of one of said friction discs, connector elements extending between the other of the friction discs and said third disc and slidable through the hub and said one friction disc, a compression spring engaged between said one friction disc and the third disc and surrounding the spindle, the spring normally urging said friction discs against the adjacent pulleys and engaging the latter in yieldable frictional driving relation with said flange, and means arranged to move said third disc inwardly and release said other friction disc and to simultaneously urge said one friction disc against the adjacent pulley and engage the same in positive driving relation with the flange.

9. A device as in claim 8 in which said last named means comprises a control knob threaded on the spindle; the knob having a bore in which said third disc and spring are disposed, the inner edge of the knob being adapted to positively engage said one friction disc as the knob moves inward on the shaft and at the same time to move said third disc inwardly.

10. A drive mechanism for projector reels, comprising a reversible drive spindle, a hub fixed on said spindle, a pair of drive pulleys, one for each reel, turnable on the hub, a friction drive flange on the hub projecting between and separating the pulleys, an element movable axially of the spindle to engage the outer face of one pulley and cause the same to engage the flange in driving relationship, another element movable axially of the spindle to engage the outer face of the other pulley and cause the same to engage said flange, means yieldably acting on the first named element normally moving the same into engagement with said one pulley and control means to move said one element in a direction in opposition to said first named means and at the same time act on said other element to cause the other pulley to be engaged by said flange in positive driving relation.

11. A structure as in claim 10, in which said elements are mounted for rotation with the hub.

12. A structure as in claim 10, in which said elements are in the form of friction discs and are mounted for rotation with the hub.

13. A selective drive mechanism for projector reels, said mechanism comprising a spindle, a pair of separate driving pulleys, one for each reel, means between the spindle and pulleys normally maintaining the latter in yieldable driving relationship with the spindle and control means arranged to act on said first named means to release one pulley from such driving relationship and at the same time cause the other pulley to be engaged with the spindle in positive driving relationship.

14. A selective drive mechanism for projector reels, said mechanism comprising a spindle adapted to be reversibly driven, a pair of reel drive pulleys, one for each reel, mounted coaxial with the spindle and means operable independently of the driving of the spindle to place one pulley in yieldable driving engagement with the spindle or to place the other pulley in positive driving engagement with the spindle selectively.

EMIL VOLLENWEIDER.